US012467605B2

(12) United States Patent
Plomteux et al.

(10) Patent No.: US 12,467,605 B2
(45) Date of Patent: Nov. 11, 2025

(54) LUMINAIRE LATCH

(71) Applicant: SIGNIFY HOLDING B.V., Eindhoven (NL)

(72) Inventors: Alexandre Plomteux, Montreal (CA); Sergio Fabian Jurdana, Quebec (CA)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/684,360

(22) PCT Filed: Aug. 16, 2022

(86) PCT No.: PCT/EP2022/072813
§ 371 (c)(1),
(2) Date: Feb. 16, 2024

(87) PCT Pub. No.: WO2023/021015
PCT Pub. Date: Feb. 23, 2023

(65) Prior Publication Data
US 2025/0146651 A1 May 8, 2025

(30) Foreign Application Priority Data
Jan. 27, 2022 (EP) .................................... 22153575

(51) Int. Cl.
*F21V 17/16* (2006.01)
*F21V 15/01* (2006.01)
*F21V 31/00* (2006.01)

(52) U.S. Cl.
CPC ............ *F21V 17/164* (2013.01); *F21V 15/01* (2013.01); *F21V 31/005* (2013.01)

(58) Field of Classification Search
CPC ....... F21V 17/164; F21V 15/01; F21V 31/005
See application file for complete search history.

(56) References Cited

U.S. PATENT DOCUMENTS 6,525,890 B1 * 2/2003 Wang ...................... F21V 17/18 359/896
9,222,632 B2 * 12/2015 Kinnune .............. F21V 29/507
2002/0167813 A1 11/2002 Wang
2007/0082677 A1 4/2007 Hart et al.
(Continued)

FOREIGN PATENT DOCUMENTS

CN 107965707 A 4/2018

*Primary Examiner* — Christopher E Dunay

(57) ABSTRACT

Apparatus for a lighting fixture or luminaire latching mechanism. A lighting fixture's housing (16) is hinged at one end or portion and includes a door (14) which latches to the housing (16) at an opposite end. A latch (12), which contains a mating hook (32), is connected to the housing (16). A latching surface (28) on the housing (16) interlocks with the mating hook (32) when the door (14) is closed. The latch member includes a main (36) and secondary flexing portion (40) with the mating hook (32) therebetween, as well as door push portion (44) and handle portion (42). The door (14) is opened by applying a force to the handle portion (42) which deforms the main (36) and secondary flexing portion (40) to disengage the mating hook (32) from the latching surface (28), as well as pushing or applying a force to the door to help disengage it from the housing (16).

10 Claims, 4 Drawing Sheets

(56) References Cited

U.S. PATENT DOCUMENTS

| | | | | |
|---|---|---|---|---|
| 2009/0066203 | A1* | 3/2009 | Zielinski | E05B 65/46 292/1 |
| 2011/0199761 | A1 | 8/2011 | Schuler | |
| 2015/0219320 | A1* | 8/2015 | Durdle | F21V 5/007 362/240 |
| 2017/0094437 | A1 | 3/2017 | Kadri et al. | |
| 2018/0376275 | A1 | 12/2018 | Jiang et al. | |
| 2020/0165843 | A1* | 5/2020 | Michetti | E05B 77/34 |
| 2020/0263452 | A1* | 8/2020 | Raz | E05B 63/248 |
| 2024/0318809 | A1* | 9/2024 | Fannin | F21V 19/0035 |

* cited by examiner

LUMINAIRE LATCH

CROSS-REFERENCE TO PRIOR APPLICATIONS

This application is the U.S. National Phase application under 35 U.S.C. § 371 of International Application No. PCT/EP2022/072813, filed on Aug. 16, 2022, which claims the benefit of European Patent Application No. 22153575.0, filed on Jan. 27, 2022; U.S. Provisional Application No. 63/298,796, filed on Jan. 12, 2022, and U.S. Provisional Application No. 63/234,802, filed on Aug. 19, 2021. These applications are hereby incorporated by reference herein.

FIELD OF THE INVENTION

The present invention relates generally to a door latch for a lighting fixture or luminaire. Specifically, the invention relates to a unitary spring latch that latches a door frame and housing of a lighting fixture without the need for any screws or fasteners. The latch also aids in preventing door vibration.

BACKGROUND

Conventional lighting fixtures or luminaires generally include a housing with a lamp assembly supported therein and a lens attached to and enclosing the housing. Additionally, the lens of a conventional fixture typically includes a frame having a latch that provides a mechanism for opening and closing the lighting fixture. The lens and frame define a door for the fixture housing or simply the closure of can be a door without any lighting functions, as is well known in the art.

Known latches for lighting fixtures typically require the use of assembled or multiple parts including separate screws & fasteners or spring & fastener and the like, to allow the latch to rotate and to secure the latch to the fixture housing. These multiple parts increase manufacturing costs and require assembly of the latch when installing the latch onto a lighting fixture. Also, conventional latches may be difficult to operate, such as requiring the operator to use both hands or more than one tool when opening and closing the latch. In particular, the conventional latches do not provide a mechanism for providing easy access to a fixture housing interior when performing maintenance thereon such as replacing parts of the lighting fixture.

For example, one mechanism for opening and closing the lighting fixture is to use a thumb screw. Although quite simple these have implications at the manufacturing level as these are often quite expensive and need additional tapping into the housing, thus, adding to the overall cost. Also, for the installer/operator the thumb screw implies that you need time (few seconds ~5-10 s) to close or open. With metallic thumb screw there could also be potential risk associated to corrosion and consideration must be designed in to avoid dissimilar metal seizure.

In a luminaire product, particularly in outdoor roadway luminaires, size, weight, and distinct parts are factors that need to be accounted for to minimize the overall luminaire cost. Moreover, there is a need for latch that consume as less as possible parallel to ground surface plane area. Ideally, such luminaires have LED boards that use as much of the plane area that is available. Thus, optimizing a design of a short and narrow luminaire, reflects directly on the associated cost.

US20110199761A1 relates to a lighting fixture having a luminaire body which supports the lamps, preferably fluorescent lamps, and has a transparent panel mounted on its light outlet side by means of a panel frame, wherein the panel frame is attached to the luminaire body such that it can be removed and replaced.

Given the foregoing, it will be appreciated that a luminaire latch is needed which consumes little linear dimension (horizontal space) in the axis of the luminaire and thus contributes to minimize luminaire cost while keeping the instantaneous function of the latch.

SUMMARY OF THE INVENTION

Accordingly, an object of the present invention is to provide a latch for a luminaire or lighting fixture that provides a mechanism for easily latching and unlatching the lens or door of the fixture, and enabling other functions as well. For example, being able to open and close the housing of the luminaire in a variety of luminaire positions and have the necessary access before installation with the luminaire positioned upside down on a work bench top and to tenon on top of the pole and make any required connections, as well as prevent door vibration.

The present disclosure is directed to inventive apparatus for a lighting fixture or luminaire latching mechanism. A lighting fixture's housing is hinged at one end or portion and includes a door which latches to the housing at an opposite end. A latch, which contains a mating hook, is connected to the housing. A latching surface on the housing interlocks with the mating hook when the door is closed. The latch member includes a main and secondary flexing portion with the mating hook therebetween, as well as door push portion and handle portion. The door is opened by applying a force to the handle portion which deforms the main and secondary flexing portion to disengage the mating hook from the latching surface, as well as pushing or applying a force to the door to help disengage it from the housing.

According to an exemplary embodiment a latch for a lighting fixture is provided, wherein the lighting fixture includes a housing and a door pivotally connected at a first portion of the housing. The latch includes a mating hook, wherein said matting hook is connected between a main flexing portion and a secondary flexing portion. The main flexing portion is substantially vertical to the main axis of the lighting fixture and the secondary flexing portion is substantially horizontal/parallel to the main axis of the lighting fixture. The secondary flexing portion further includes handle portion extending from an end opposite of the mating hook connection, the main flexing portion is connected to the housing adjacent a second portion of the housing. The second portion being substantially opposite the first portion. The latch further includes a door push portion connected to the main flexing portion between the housing and the matting hook connections. A latching surface on the door is disposed such that when the door is closed onto the housing, the mating hook engages the latching surface so that the door is latched closed. The handle portion and the mating hook are aligned such that when a force is applied to the handle portion, the main flexing portion, the secondary flexing portion and the door push portion are configured to be deformed and disengaged the mating hook from the latching surface, thereby permitting said door to be opened, and apply a force to the door.

Importantly, the flexing portion are designed to provide several functions. Reduce impact in between parts providing a smooth amortization when the system is submitted to vibration, for example in bridge installations or during wind effects. Facilitate and speed maintenance, in a variety of lighting fixture position, providing a fast-opening solution by applying the required force to the door to make this one pop out for easy access.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF PREFERRED EMBODIMENTS

Figure 1A:
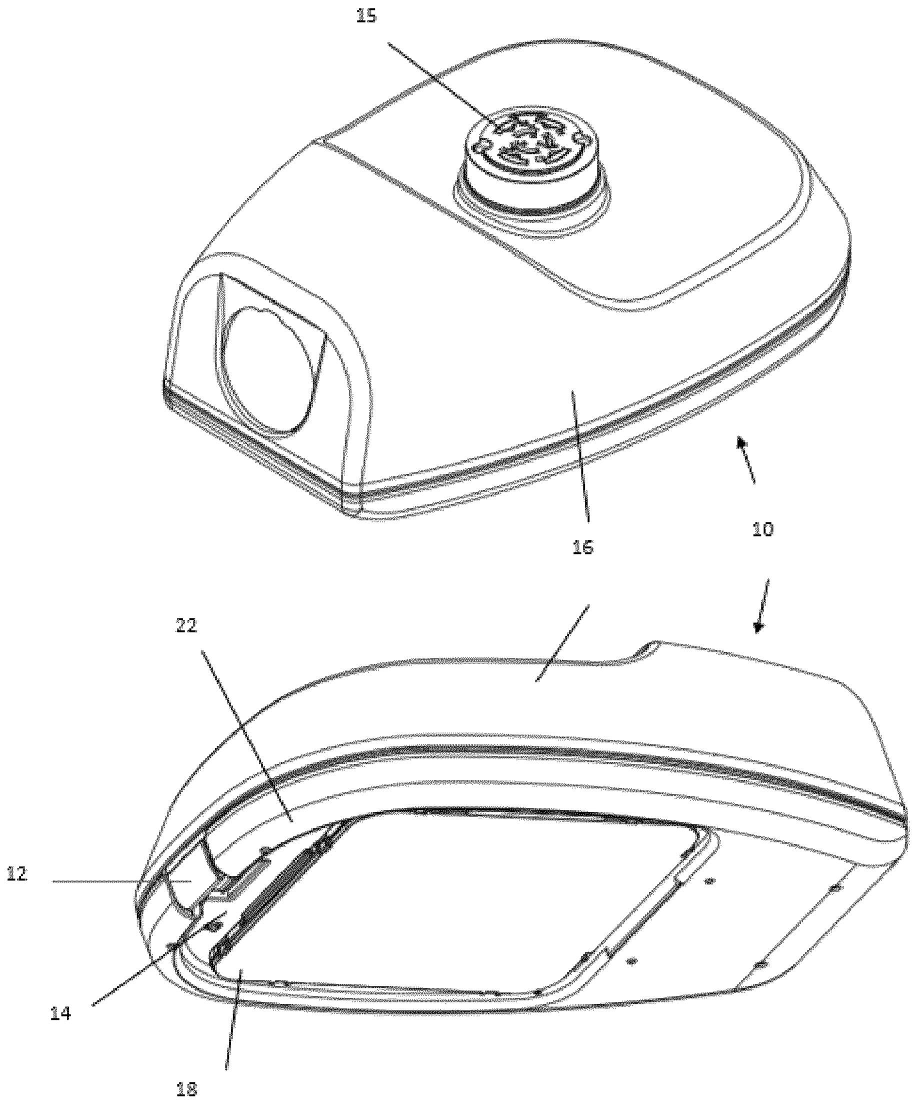
FIG. 1A are perspective views of a lighting fixture according to the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 1B:
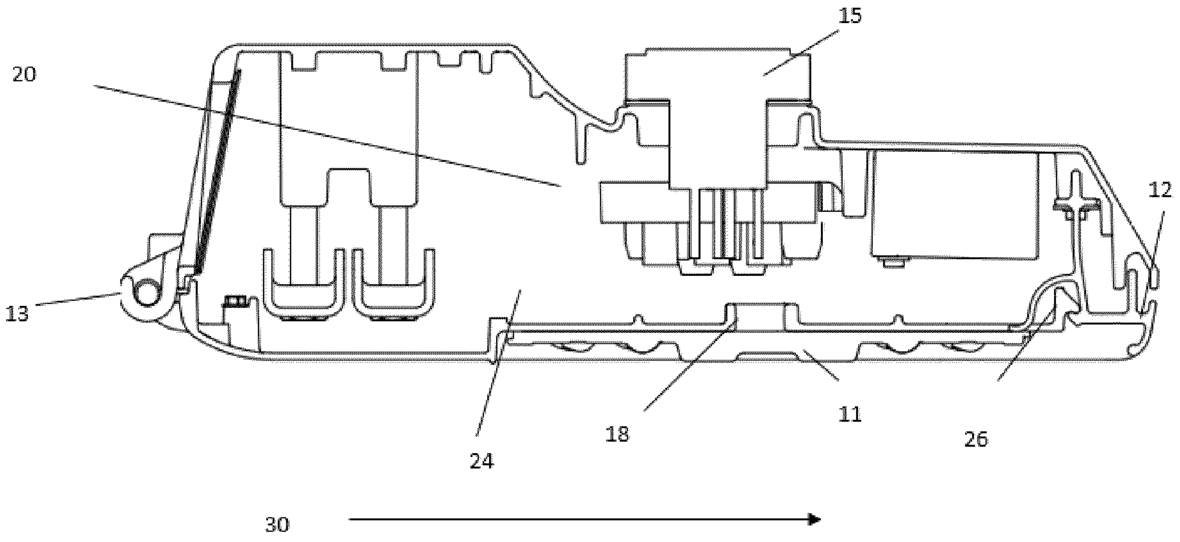
FIG. 1B is cross-sectional view of the lighting fixture of FIG. 1A.
Figure 2:
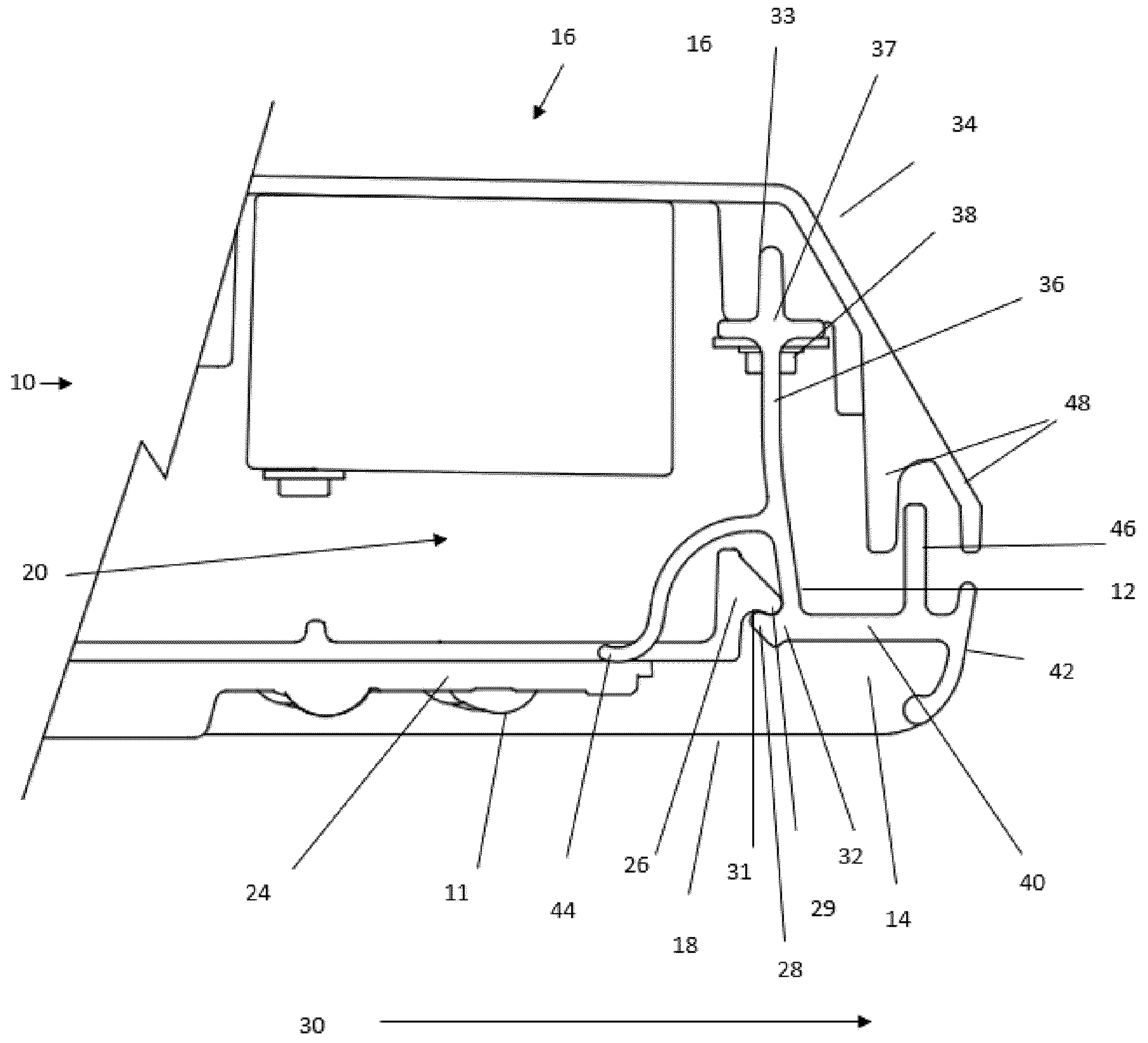
FIG. 2 is another cross-sectional view of the lighting fixture of FIG. 1A.
Figure 3:
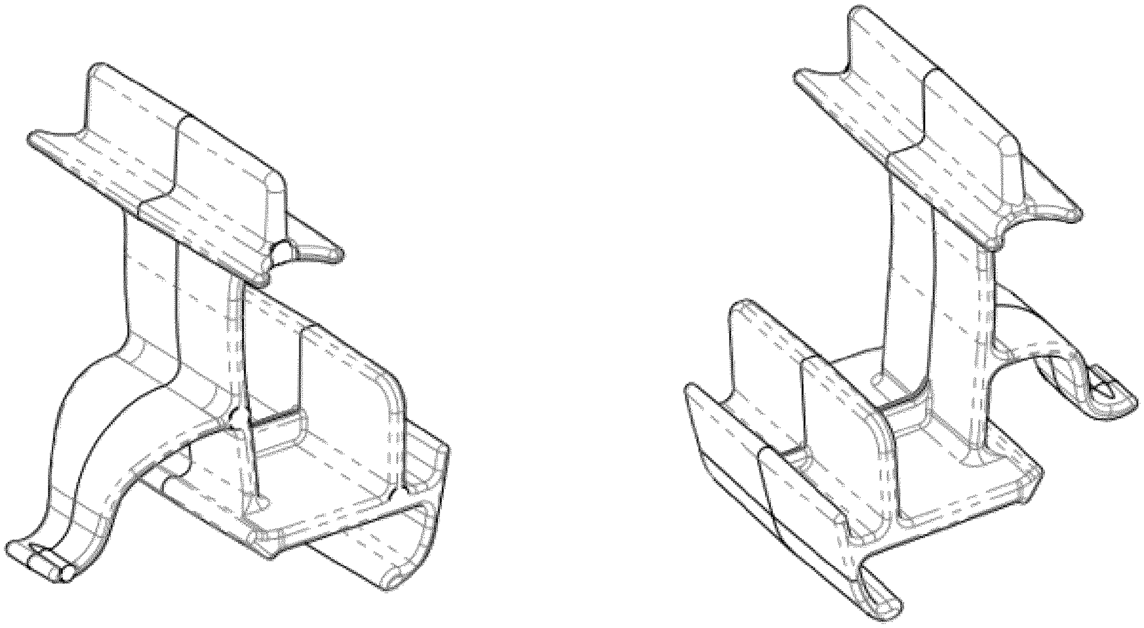
FIG. 3 are perspective views of a lighting fixture latch for use with the lighting fixture of FIG. 1A.

Referring now in detail to the drawings, wherein like numerals indicate like elements throughout the several views, there are shown in FIGS. 1-3 various aspects of a lighting fixture a latch according to the present invention.

Referring to FIGS. 1-3, a luminaire or lighting fixture latch 12 in accordance with the present invention latches and unlatches a door 14 and a housing 16 of a luminaire 10. Latch 12 is preferably a resilient and flexible member, such as a polycarbonate or steel spring, that operates without separate pins or fasteners and also assists in supporting door 14 of luminaire 10.

Luminaire 10 includes door 14 pivotally coupled to housing 16 by hinges 13 allowing luminaire 10 to be opened and closed. Luminaire housing 16 includes an inner area 20 for holding lighting components, such as LED boards 11, drivers, sensors, controllers 15, optical lenses, reflecting members, etc., as is well known in the art. Door 14 has a door support area 18 configured to support one or more of a refractor, diffuser, printed circuit board, LEDs or a lens. The door support area 18 can be covered by a translucent panel, for example, glass or plastic. Door 14 also can include a gasket (not shown) applied to the perimeter of door 14. The gasket provides a seal when luminaire 10 is closed, thereby protecting the inner components enclosed within inner receiving area 20 of luminaire housing 16. The gasket is preferably made of a plastic or rubber or similar material.

Door 14 includes a frame 22 that supports door support area 18. Frame 22 includes an inner surface 24. The inner surface 24 has a shoulder 26 extends along a portion of the inner surface 24 of frame 22 for engaging latch 12. In particular, inner surface 24 includes a shoulder 26 that includes an under/over lip or inverted trough portion 29 thus, the combination of the shoulder 26 and inverted trough portion provides latching surface 28. The inverted trough portion 29 can be in either vertical direction of the axis 30 of the lighting fixture 10, to enable a "Push" or "Pull" function of the latch 12, as further described below. Latching surface 28 is located along an outer perimeter of inner surface 24 of shoulder 26 of door 14, as shown FIG. 2. Importantly, latching surface 28 is not located near the perimeter of frame 22 but located a predetermined distance to the interior of thereof on inner surface 24 (preferably a 1 inch or so in length from the outer perimeter of luminaire 10, but it can be any length as long as latch 12 can be accommodated to mate with latching surface 28). Thus, to minimize the linear dimension (horizontal space) in the axis of the luminaire (shown by arrow 30), mating hook 32 of latch 12 extends behind a portion of door support area 18 to mate with latching surface 28, thus helping to consume less visible horizontal space of luminaire 10.

Housing 16 can be formed in a rectangular, circle or square (or any polygon) with of side walls and a top wall defining inner receiving area 20 along with door 14. On side wall or first portion of the housing 15, generally opposite latching surface 28, are hinges 13 to pivotally connected or couple the door 14 to the housing 16. Housing 16 includes a latch receiving area 34, located at a second portion of the housing substantially opposite said the first portion of the housing with hinges 13, along the outer perimeter edge thereof and in inner area 20 to receive latch 12 and fix latch 12 to housing 16. As will be recognized, the latch 12 can be integrated with housing 16 at the second latch receiving area 13. Latch receiving area 34 can include a slot 33 to receive an end of main flexing portion 36 of latch 12. Latch receiving area 34 can also include a fixation element 38, such as a screw, Revit, clip or other means to retain the end of main flexing portion 36 to the housing 16. Housing 16 further includes a channel area 48 to receive a stop portion 46 of the latch 12. Channel area 48 is generally U-shaped. Channel area 48 is used to inhibit the stop portion 46 from extending/deforming beyond a predetermined length/area during deformation from a pull or push activation of the handle portion 42, as further described below. In this manner, one, an indication or indicator (to a user) is provided as to the correct force needed to engage/disengage the latch 12, by providing increased pressure or when the stop portion 46 engages the channel area 48; and two, the latch 12 is provided a measure of breakage/over-bending protection from an over applied level of force during the pull or push activation of the handle portion 42. As will be recognized by those skilled in the art, latch 12 could be used in any axis 360 degree around a luminaire of any shape (square, rectangle, round or any other shape), based on the placement of hinges 13 and latching surface 28.

As seen in FIGS. 2-3, latch 12 is a unitary one-piece member preferable made of a flexible and resilient material, such as polymer, plastic or flexible metal. In particular, latch 12 is preferably a polycarbonate polymeric spring feature. In general, latch 12 includes a main flexing portion 36 having end portion 37 extending from mating hook 32, and secondary flexing portion 40 also extending from mating hook

32. Also a handle portion 42 that extends from the secondary flexing portion 40, the handle portion 42 and mating hook 32 are at opposite ends of secondary flexing portion 40. The combination of main flexing portion 36, mating hook 32, and secondary flexing portion generally form an L-shape. Handle portion 42 generally extends below the L-shape. Handle portion 40 provides a mechanism for actuating latch 12. Latch 12 further includes a door push portion 44 that extends from the body of main flexing portion 36, preferably a third to one half way from the end portion 38 or the mating hook 32, over the shoulder 26 to the inner surface 24 of frame 22. The door push portion 44 is generally curved or semi-circular, but can also form a portion of a triangle or inverted V-shape (not shown).

Latch 12 can be configured so that it is activated by a pull or push direction of the handle portion 40, relative to the axis 30 of the luminaire 10. By its deformation the pull or push activation will generate a movement that could be in or off axis of the luminaire. The pull or push function is provided by configuring the mating hook 32 to mate either below or above the latching surface 28 using a below or above (not shown) mating area 31 with respect to the latching surface 28. The configuration shown in FIG. 2, the mating hook 32 is configured to engage the latching surface 28, below the latching surface 28. This in turn provides a "pull" function. For example, when handle portion 42 is "pulled" the mechanism for actuating latch 12 is activated, by forcing the mating hook 32 to go in a downward vertical direction (relative to the axis 30 of the luminaire 10) of the latching surface 28, and disengage. Alternatively, (not shown) if the mating hook 32 is configured to engage the latching surface 28, above the latching surface 28, a "push" function is provided. For example, when handle portion 42 is "pushed" the mechanism for actuating latch 12 is activated, by forcing the mating hook 32 to go in an upward vertical direction (relative to the axis 30 of the luminaire 10) of the latching surface 28, and disengage. Latch 12 further includes a stop portion 46 that is used with channel area 48 to inhibit the stop portion 46 from extending/deforming beyond a predetermined distance/amount during a pull or push force activation of the handle portion 42, and thereby inhibiting further deformation of the main flexing portion 36 and secondary flexing portion 40 of latch 12.

The door push portion 44 enables two important features. One, when the luminaire is in the reverse direction (upside down), for example, on a table top for display or maintenance purposes, to apply a force to lift slightly the door 14 and ease access to the receiving area 20 of luminaire housing 16. In particular, when the luminaire 10 is in the reverse position e.g. to access the door support area 18, for example, the light engine, that is facing upward and with the help of this feature applies a force to the door and 'pops' the door out a little to help the person access this area when latch 12 is activated via "Push/Pull" force. Two, door push portion 44 also prevents a portion of door vibration since it prevents the door 14 from vertical movement with respect to the luminaire axis 30 (e.g. movement up and/or down).

Although latch 12 is preferably a unitary one-piece member, a main flexing portion 36, end portion 38, mating hook 32, secondary flexing portion 40, a handle portion 42, door push portion 44 and stop portion 46, can be formed separately and integrally attached. Also, more than one latch 12 can be used with luminaire 10.

Using latch 12 of the luminaire 10, the door 14 and the housing 16 can be latched and unlatched simply and easily using latch 12. As seen in FIG. 2, luminaire 10 is in a closed position with latch 12 in an engaged position with housing 16. Door 14 moves between open and closed positions with respect to housing 16 by pivoting about hinges 13. Securing door 14 to housing 16 when in the luminaire is in its closed position and moving latch 12 to its latched position requires the application of force between the resilient and flexible nature of latch 12 and latching surface 28. Specifically, mating hook 32 abuts latching surface 28 of shoulder 26.

Finally, as seen in FIG. 2, mating hook 32 moves past shoulder 26 until it is received in the undercut or inverted trough portion abutting and engaging mating hook 32. This results in mating hook 32 being caught or hooked under (or over, not shown) shoulder 26 thereby securing door 14 to housing 16.

Returning latch 12 to its released position only requires moving handle portion 40 towards or away from door 14 (e.g. a "Push" or "Pull" force), thereby reversing the steps described above for latching latch 12. Since latch 12 is resilient and flexible, upon moving handle portion 40, main flexing portion 36 and/or secondary flexing portion 40 flexing portion 72 will flex away from shoulder 26. By applying force to handle portion 40, door 14, latch 12 will move back to its released position, and with mating hook 32 being released from undercut section of shoulder 26.

FIG. 3 shows perspective views of lighting fixture latch 12 for use with the lighting fixture of FIG. 1A.

While a particular embodiment has been chosen to illustrate the invention, it will be understood by those skilled in the art that various changes and modifications can be made therein without departing from the scope of the invention as defined in the appended claims. The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

Any reference signs in the claims should not be construed as limiting the scope of the claims or the invention described by the subject matter claimed.

The invention claimed is:

1. A lighting fixture comprising a housing, a door pivotally connected to a first portion of the housing, and a latch; wherein the latch includes, a mating hook, wherein the mating hook is connected between a main flexing portion and a secondary flexing portion, the secondary flexing portion further includes a handle portion extending from an end opposite of the mating hook, the main flexing portion is connected to the housing adjacent a second portion of the housing, the second portion being substantially opposite the first portion, and wherein the latch further includes a door push portion connected to the main flexing portion between the housing and the matting hook to enable a force to the door and reduce vertical door movement and/or vibration of the door;

a latching surface on the door, wherein the mating hook engages the latching surface when the door is closed; and wherein the handle portion and the mating hook are aligned such that when a force is applied to the handle portion, the main flexing portion, the secondary flexing portion and the door push portion, are configured to be deformed and disengage the mating hook from the latching surface, thereby permitting the door to be opened.

2. The latch according to claim 1, further including a stop portion that engages a channel area of housing to inhibit the mating hook from extending/deforming beyond a predetermined distance/amount when the force is applied to the handle portion.

3. The lighting fixture according to claim 1, wherein the door push portion prevents the door from vertical movement when the mating hook and the latching surface are engaged.

4. The lighting fixture according to claim 1, wherein the latch is a resilient and flexible member, and is made from at least one of a polymer, a plastic, a flexible metal, a polycarbonate or a steel spring.

5. The lighting fixture according to claim 1, wherein the latching surface includes a shoulder extending parallel to secondary flexing portion, the shoulder includes an under/over lip or inverted trough portion to engage a corresponding below or above mating area of the mating hook.

6. The lighting fixture according to claim 1, wherein the mating hook extends behind a portion of door to mate with the latching surface.

7. The lighting fixture according to claim 1, wherein the force applied to the handle portion, is a pull force to disengaged the mating hook from the latching surface.

8. The lighting fixture according to claim 1, wherein the latch is a unitary one-piece member.

9. The lighting fixture according to claim 1, wherein the main flexing portion is integrated to the housing at the latch receiving area.

10. The lighting fixture according to claim 1, wherein the main flexing portion is substantially perpendicular to the secondary flexing portion.

* * * * *